United States Patent [19]

Greineder

[11] Patent Number: 4,659,904
[45] Date of Patent: Apr. 21, 1987

[54] SHUT-DOWN CONTROL DEVICE FOR WELDING CARRIAGE AND METHOD

[75] Inventor: Walter M. Greineder, Lancaster, Pa.

[73] Assignee: High Steel Structures, Inc., Lancaster, Pa.

[21] Appl. No.: 750,853

[22] Filed: Jul. 1, 1985

[51] Int. Cl.[4] .............................................. B23K 9/12
[52] U.S. Cl. ............................ 219/130.21; 219/125.1; 219/136; 219/137 PS
[58] Field of Search .............. 219/136, 130.21, 124.31, 219/137 PS, 125.1

[56] References Cited

U.S. PATENT DOCUMENTS

| | | | |
|---|---|---|---|
| 1,580,020 | 4/1926 | Cutler et al. | |
| 3,267,251 | 8/1966 | Anderson | |
| 3,373,914 | 4/1968 | Wall | |
| 3,509,314 | 4/1970 | Freytag | 219/131 |
| 3,691,440 | 9/1972 | Haddock | 318/313 |
| 3,780,297 | 12/1973 | Geary | 250/231 |
| 3,787,657 | 1/1974 | Denis et al. | 219/117 |
| 4,010,346 | 3/1977 | Cecil et al. | 219/125 |
| 4,030,617 | 6/1977 | Richter | 214/1 |
| 4,115,684 | 9/1978 | Lindbom | 219/124 |
| 4,118,620 | 10/1978 | Wall et al. | 219/124 |
| 4,147,919 | 4/1979 | Matasovic | 219/132 |
| 4,151,395 | 4/1979 | Kushner et al. | 219/125 |
| 4,328,412 | 5/1982 | Watanabe et al. | 219/136 |
| 4,426,565 | 1/1984 | Ruter | 219/130 |

FOREIGN PATENT DOCUMENTS

| | | | |
|---|---|---|---|
| 55-51670 | 12/1980 | Japan | 219/130.21 |
| 538843 | 12/1976 | U.S.S.R. | 219/130.21 |

OTHER PUBLICATIONS

Lincoln Electric LN-9 Semi-Automatic Wire Feeder Operating Manual IM-294, May 1981.
Lincoln Electric LN-9 Operating Schematic, May 1978.
Red Lion Controls Bulletin #PRS1-001, Jun. 1983.
Red Lion Controls Catalog 8001b Rev. 10/81, (Cover Page & p. 18).
Lincoln Electric Squirtmobile Operating Manual IM-235-B.

*Primary Examiner*—Clifford C. Shaw
*Attorney, Agent, or Firm*—Thomas Hooker

[57] ABSTRACT

A shut-down control for a welding carriage supporting an arc welding gun automatically shuts down the gun after the carriage has stopped moving along a weld plate for a timing interval but before the continuously welding gun injures the plate.

34 Claims, 3 Drawing Figures

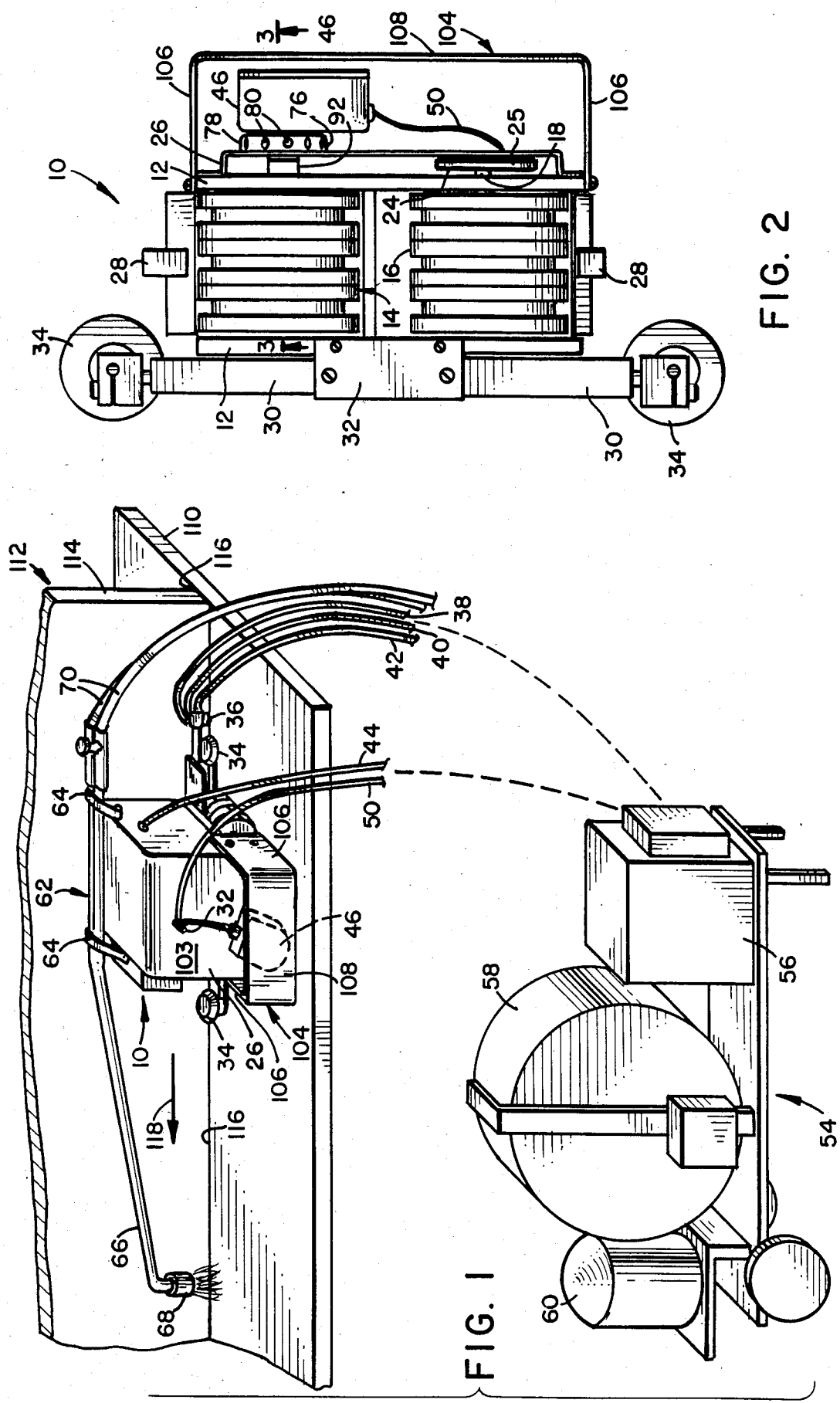

SHUT-DOWN CONTROL DEVICE FOR WELDING CARRIAGE AND METHOD

This invention relates to control of a welding carriage used to move an arc welding gun along a weld plate and, more particularly, to a device and method for automatically shutting down the carriage and gun an interval of time after the carriage stops moving along the plate but before welding injury to the plate because of the continuing arc welding.

It is conventional to mount an arc welding gun on a carriage for movement along a weld plate so that the gun forms a continuous weld joining the plate carrying the carriage to another plate. The carriage may also carry a preheat torch located downstream from the arc weld gun and aimed at the weld area to preheat the area before the plates are welded together in order to avoid stressing and cracking the plates during welding. Preheating also drives moisture out of the plates before welding. The preheat temperatures, at the weld site, may be as high as 450° F. This means that the preheat torch must heat the plates to a temperature greater than the weld site preheat temperature to assure that the plates are at a proper temperature when welded.

The weld carriage is conventionally located between the flame of the preheat torch and the arc welding gun and is subjected to high temperatures it traverses the length of the plates during the welding run. This high temperature environment stresses the mechanical and electrical components of the carriage and may result in a breakdown of the carriage drive so that the carriage, torch and gun stop moving along the weld run. The weld gun continues to operate independent of movement of the carriage. As welding continues at a fixed location on the plates heat builds up, the metal in the plates and the weld wire supplied to the weld site melt to form a puddle of molten metal, and the plates erode and eventually burn through their thickness. The longer the arc welder is allowed to operate without motion after the carriage breaks down the greater the risk of erosion or burn through. The plates may be damaged very quickly, for instance, when welding using a carriage with a fast traverse and a 600 amp weld, a 3 inch diameter molten puddle of metal may be formed within 15 or 20 seconds after carriage breakdown. The longer the arc welder is allowed to operate in one place after the carriage breaks down the greater the risk of erosion or burn through.

The damage from continuous arc welding at a fixed location can frequently be repaired, although the process is time consuming and expensive. In some cases the damage cannot be repaired and the weld plates must be scrapped. In applications where the plates are welded together to form high-load, fracture-critical members, such as highly stressed construction beams and the like, unexpected stoppage of the carriage may require scrapping the entire beam, because a repaired beam would not meet specifications.

The improved welding carriage of the present invention includes a shut-down control device which senses movement of the carriage along the plate by monitoring rotation of an idler wheel engaging the plate. In the event the carriage stops moving along the plate, whether because of a drive breakdown or because of loss of traction between the drive wheels and the work, the sensor output changes, the changed output is sensed by a circuit and a timing interval is initiated. This interval runs until either the carriage resumes movement along the plate, for instance when traction is re-established between the drive wheel and the plate, or the interval expires. At expiration of the timing interval the circuit automatically shuts down the arc welding gun and the carriage drive motor, before the arc welding gun has supplied sufficient heat and weld metal to the stationery weld site to injure the weld plates. The interval is adjustable dependent upon the thickness of plates being welded so that the interval expires before the stationary arc damages the plates.

Motion of the weld carriage is sensed by a rotary speed sensor located on the side of the weld carriage away from the weld area. In this way, the weld carriage may be positioned on the weld plates with the other side closely adjacent the weld area. This facilitates mounting and properly locating the preheat torch and the weld gun. The carriage shields the relatively delicate sensor from the high welding temperatures. The sensor is secured to the weld carriage using a specialized heat insulating and dissipating mount to further insulate the sensor heat conduction from carriage. In this way, the reliability of the rotary speed sensor is increased. In the unlikely event of failure of the rotary speed sensor, the failure interrupts the output signal and automatically shuts down the carriage and weld gun.

The shutdown control device also facilitates starting and stopping of the carriage at the beginning and end of the weld run. At the beginning of the run the carriage is placed on the weld plate and the preheat torch and weld gun are suitably positioned for the weld run. The controls and feeds for the carriage motor and the weld gun are properly adjusted and actuated. After this has been completed, the weld run is begun by simply pushing or nudging the carriage in the downstream direction so that the sensor emits a signal sufficient to actuate the carriage drive and the weld gun. The preheat torch is controlled manually.

The shutdown control device is used to stop the carriage at the end of the weld run by placing an obstacle in the path of the carriage to block motion of the carriage and thereby automatically shutdown the carriage drive and the weld gun. Likewise, in the case of an emergency, an operator may easily stop the carriage and shut off the weld gun by placing an obstacle in the path of the carriage during the weld run. These methods of starting and stopping the carriage and gun test the shutdown control device to assure it is operating properly and will shutdown the carriage and gun in the event the carriage stops moving during a welding run.

Other objects and features of the invention will become apparent as the description proceeds, especially when taken in conjunction with the accompanying drawings illustrating the invention, of which there are two sheets and one embodiment.

IN THE DRAWINGS

FIG. 1 illustrates a weld carriage with attached preheat torch and arc weld gun in position for welding a web plate and flange plate of an I-beam and a control station;

FIG. 2 is a bottom view of the carriage of FIG. 1; and

Figure 3:
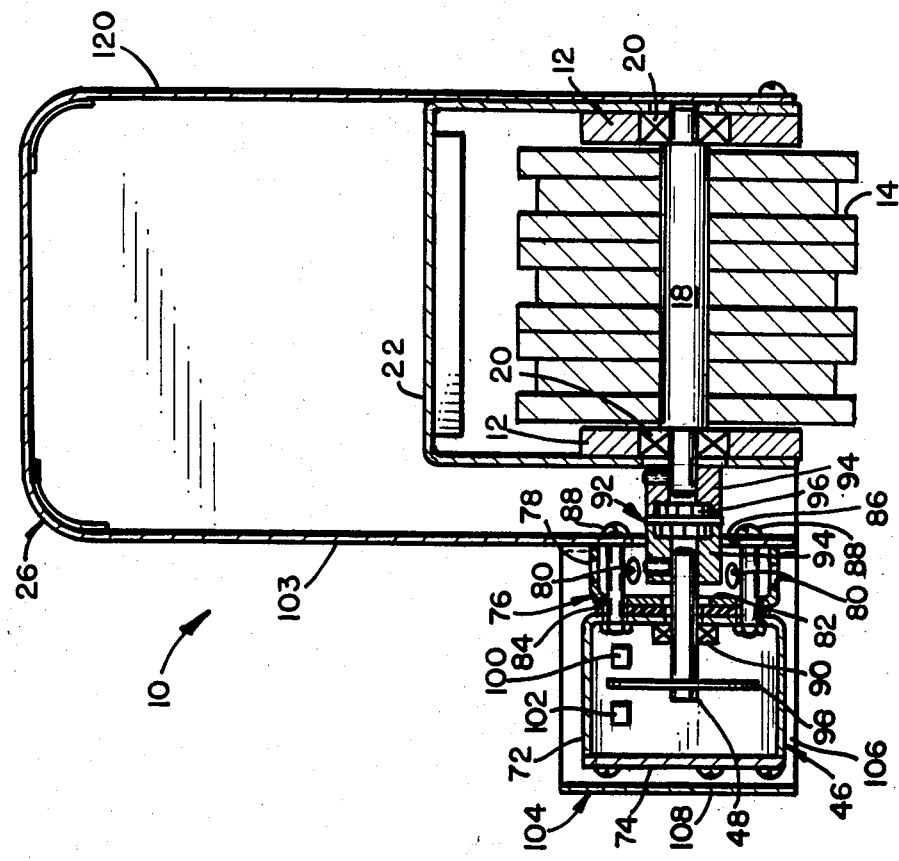
FIG. 3 is a sectional view taken generally along line 3—3 of FIG. 2.

Weld carriage 10 includes a frame 12, and a pair of wide magnetic wheels 14 and 16 mounted on axles 18 journaled in bearings 20 in frame 12. As shown in FIG. 3, wheels 14 and 16 extend downwardly below the frame. The wheels hold the carriage on a weld plate during a welding run along the plate.

Carriage 10 includes a support plate 22 mounted on frame 12. An electric motor, speed control circuitry and a drive transmission (not illustrated) are mounted on plate 22. The transmission drives an output pulley which is joined to drive pulley 24 mounted on the axle of drive wheel 16 by a belt 25 as shown in FIG. 2. In this way, the motor of carriage 10 rotates wheel 16 to drive the carriage and supported pre-heat torch and arc gun along weld plates. Idler wheel 14 is not connected to the carriage drive and rotates along the plates supporting the carriage in response to movement of the carriage by drive wheel 16. A rheostatic control for adjusting the rotary speed of drive wheel 16 is mounted on the support plate 22 with an adjustment knob projecting outwardly of the carriage.

Protective sheet metal housing 26 extends around the top, front, back and sides of carriage 10 and serves to protect the carriage and drive from physical or temperature injury resulting from the workshop and high temperature weld environment to which carriage 10 is exposed. Arc weld gun mounts 28 are provided on opposite ends of the carriage, supported by frame 12.

A pair of adjustable arms 30 are mounted on a support block 32 on frame 12 located on the side of the carriage 10 adjacent the weld area. Guide rollers 34 are adjustably mounted on the ends of arms 32 for contact with a web plate extending up from the weld area.

As illustrated in FIG. 1, an arc welding gun 36 secured to mount 28 on the back of the carriage is aimed at the weld area. Conventional electric power cable 38, flux supply tube 40 and weld wire supply tube 42 are connected to gun 36. If desired, the wire supply tube 42 may be located within power cable 38. An electric power cable 44 is connected to the speed control circuitry for carriage 10 and extends outwardly from housing 26.

Rotary speed sensor 46 is mounted on the side 103 of housing 26 away from the weld area and includes an input shaft 48 connected to the axle 18 of idler wheel 14. Sensor cable 50 extends from rotary sensor 46 to a strain relief support 52 on housing 26 adjacent the sensor and includes leads for supplying power to the rotary sensor and leads for transmitting the output of the sensor to the control circuitry for the weld carriage.

The cables 38, 44 and 50 and tubes 40 and 42 are relatively long and lead to portable supply and control station 54. The cables and tubes permit movement of carriage 10 along the plates to be welded without the necessity of moving station 54. Station 54 includes control circuitry housing 56, a weld wire supply 58 and flux supply 60. The control circuitry in housing 56 is connected to a power source and to one work cable of a high-current source to supply welding current to gun 36. The other work cable from the high-current source is connected to the plates to be welded to complete the welding circuit.

A preheat torch 62 is secured to the top of housing 26 by suitable fasteners 64 and includes a gas tube 66 extending a distance downstream from carriage 10 with a flame tip 68 aimed toward the weld area. Lines 70 supply combustion gasses to torch 62. As shown in FIG. 1, the carriage is located between the torch tip 68 and the welding gun 36.

The rotary sensor 46 includes a hollow housing 72 with an end cap 74. A cup spacer 76 is located between the sensor housing 72 and carriage housing 26 and includes a cylindrical portion 78 provided with a plurality of spaced vent openings 80 and a side wall 82 facing outwardly of the carriage housing. A heat-insulating gasket 84 is positioned between wall 82 and housing 72. The gasket 84 is preferably formed of high temperature-resistant material. The edge of portion 78 away from wall 82 abuts the carriage housing 26 with the spacer surrounding an opening 86 formed through the housing, coaxial with idler wheel axle 18. The spacer, gasket and sensor are held in place on the carriage housing by means of a number of nuts and bolts 88 which extend through holes formed in the carriage housing, spacer, gasket and sensor housing, as illustrated. The bolts are preferably formed of a low heat conductive material, such as stainless steel, to reduce the flow of heat from the carriage to the sensor.

Sensor input shaft 48 is journaled in a bearing 90 carried by housing 72 and extends through openings in the housing, gasket and wall into the interior of the cup spacer 76. Shaft coupling 92 includes a pair of plastic heat insulating coupling halves 94, with one coupling half secured to input shaft 48 and the other coupling half joined to an extension of the idler wheel axle 18 extending outwardly of the frame 12. The coupling halves 94 are removably joined to a center member 96 to permit ready detachment of the rotary sensor from the carriage without the necessity of disengaging the coupling halves from their respective shafts. The coupling 92 provides a heat insulating connection between the idler wheel and the sensor input shaft 48 to assure that the two rotate together.

Rotary sensor 46 includes an aperatured disk 98 mounted on input shaft 48 within housing 72 to rotate with rotation of the shaft. A plurality of spaced aperatures (not illustrated) are formed through the thickness of the disk adjacent its outer circumference for rotation between a light source 100 and a light sensor 102, both mounted on housing 72. The source directs a beam of light toward the sensor. The beam normally is blocked by disk 98. Rotation of the disk moves the aperatures between the source and the sensor such that when an aperature is located directly between the two light passes through the aperature and is received by the sensor. This beam is chopped by the sensor. When wheel 14 is rotated in response to movement of weld carriage 10 along a weld plate pulses of light are received by the sensor 102 which generates a pulsed output transmitted by cable 50 to control circuitry in housing 56.

As illustrated in FIGS. 1 and 2, the rotary sensor 46 extends outwardly from the side 103 of the weld carriage away from the weld area. A protective shroud 104 is joined to the ends of the carriage housing 26 at side 103 and includes a pair of end portions 106 extending outwardly from the ends of the housing and a side portion 108 joining the outer ends of portions 106 and extending past the sensor to protect the sensor from injury. The shroud is open at the top and bottom to permit circulation of air around the sensor and the connection with the carriage for cooling.

The weld carriage 10 may be of the type manufactured by the Lincoln Electric Company of Cleveland, Ohio and marketed under the Squirtmobile trademark.

The carriage 10 with weld gun 36 and torch 26 is used to weld beams and other members with relatively long weld runs from various thickness plates. The plates normally range in thickness from $\frac{1}{4}$ inch to 1 inch.

The lower portion of the beam web plate 114 is shown abutting the center of the flange plate 110. The web and flange plates are conventionally tack welded together prior to forming of single or multipass arc welds in the Vees 116 on both sides of the web plates 114. Following welding of the Vees on the lower flange plate 110 the beam is reversed in position and the operation is repeated to weld the other flange plate to the web plate, thus forming the beam. The welding of the plates together at the Vees is performed by positioning the weld carriage 10 on one side of a flange plate so that the magnetic wheels 14 and 16 engage the flange. The guide rollers 34 and other conventional guide means are adjusted so that rotation of drive wheel 16 by the carriage drive moves the carriage along the flange parallel to the web plate in the position shown in FIG. 1. The arc welding gun 36 is positioned so that an arc is maintained between the weld wire fed to the gun and the plates for depositing a welded layer at the weld area in the Vee. The weld carriage moves downstream along the plate in the direction of arrow 118 with the flame of torch 62 preheating the upstream metal in the Vee prior to formation of the arc weld.

The shutdown control circuitry for carriage 10 and weld gun 36 automatically shuts off the welding current and weld wire feed to welding gun 36 and the power supplied to the carriage drive motor during a welding run. Shut down occurs after the motion of the carriage along the work stops for an interval of time, but before the risk of arc weld injury to the weld plates. The injury may be in the form of erosion by melting or burn through of the plates.

The control circuitry in housing 56 includes conventional control circuitry for the automatic weld wire feed and the weld gun and a power supply control for the drive motor of carriage 10. During set-up of the carriage to perform a given welding operation, the speed control of carriage 10 and circuitry in housing 56 are adjusted appropriately to assure that the gun is moved along the weld plate at a desired speed and proper current, and weld wire and flux are supplied to the gun. During set-up the gun is adjusted to assure that the resultant in weld bead is applied in the Vee 116 between plates 110 and 114 as required. The arms 30 and guide rollers 34 are also adjusted to space the carriage on the plate as illustrated in FIG. 1.

When the carriage is moved along the plate 110 by drive wheel 16, the idler wheel 14 is rotated, disk 98 chops the light from source 100 and sensor 102 sends a stepped signal through cable 50 to the shut-down circuitry. If, for any reason, the motion of the carriage over the plate stops, whether the drive wheel 16 is or is not still rotating, the disk no longer rotates and the shutdown circuitry no longer receives the chopped signal. An adjustable timing interval is then triggered. Upon expiration of the interval without further signal from the sensor, the circuit automatically shuts down the carriage and welding operating by shutting off welding current to the gun 36, feeding of weld wire to the gun and shutting off power to the carriage drive motor. The interval is adjustable from between 2 to 3½ seconds.

The control circuitry includes provision for setting up the carriage and welding gun on a weld plate with the power supplies and feeds connected for operation with the exception that the connections are defeated by the shut-down control circuitry. When in this position, the welding operation is automatically started by nudging the carriage 10 forward in the direction of arrow 118, thereby rotating wheel 14 and generating a pulsed output from sensor 46 which actuates the various control circuits and feeds without delay so that the carriage is driven along the work and see desired welding bead is formed at the weld site in Vee 116.

During the welding process, the torch 52 directs a preheat flame against the weld area downstream of the carriage to heat the weld area to optimum temperature for arch welding. The preheat temperatures range from about 150° F. to about 450° F. Because this temperature is the optimum temperature of the metal plates when arc welded the torch must heat the plates to a temperature higher than the perheat temperature. This assures that by the time the carriage moves the weld gun the distance between the gun 36 and torch 68 the plates cool to the desired preheat temperature. Preheating reduces cracks.

During the welding run the carriage 10 is heated by the torch, the heated plates 110 and 114 along which it travels and by welding arc. The temperature of the plates may be higher than 450° F. Exposure to this high temperature environment during production welding runs stresses the carriage. Breakdowns occur which stop the carriage on the beam 110. The drive motor, its speed control circuitry, transmission and belt drive may fail. The magnets in the drive wheel 16 may weaken so that the wheel loses traction with the flange.

The motion of the carriage along the plate may also be stopped by imperfections on the plate such as mill scale or weld splatter. In this event, the drive wheel may stall without moving the carriage along the flange. Obstructions left on the plate can block and stop the carriage.

During welding the idler magnetic wheel 14 rests upon the plate 110 and rotates relative to the plate in response to movement of the carriage along the flange by the drive wheel 16. The wheel 14 rotates even though the hot welding environment has decreased the efficiency of the wheel magnets. Rotation of the disk 98 is thus a true indication of movement of the carriage along the plate.

During welding the carriage may occasionally encounter temporary stoppages or slippages when the drive wheel encounters a relatively minor amount of mill scale or weld splatter on plate 110, which the carriage will eventually pass over, albeit at a reduced speed. Passage over these imperfections in the plate is believed to require time for the carriage drive motor to generate increased torque to pull the carriage forward. Stoppage of the carriage for this cause is inconsequential so long as there is no undue heating at the weld area. It has been found that when welding plates having a thickness from ¼ inch to as great as 1 inch delay intervals of 2½ seconds to 3 seconds may be safely tolerated without appreciable injury to the plates. If the arc weld is not shut down, burn through may occur a quickly as 5 seconds after carriage stoppage.

The timing interval for the shut-down control devices is adjustable between 2½ and 3 seconds, with the shorter period used when welding thinner plates and the longer period used when welding thicker plates which have a greater capacity to asorb heat without increase in temperature.

The operation of the invention during a welding run will now be described. During movement of the carriage 10 along a plate 110 rotary speed sensor 46 generates a continuous stream of stepped pulses which are transmitted through cable 50 to the shut-down circuitry. Welding continues in this manner as long as the shutdown circuitry receives signals from the sensor 46.

In the event the movement of the carriage along flange 110 stops, whether or not rotation of the drive wheel 16 stops, wheel 14 no longer rotates, the shutdown circuitry no longer receives the stepped signal from sensor 46 and the timing interval in the circuitry is triggered. If the signal from sensor 46 resumes during the timing interval, indicating that the carriage has recommenced moving along plate 110, the shutdown circuitry is reset and welding continues. In this way, slippage caused by mill scale or weld splatter which temporarily stops the carriage but which the carriage overcomes within the timing interval does not shut down the arc welding operation.

However, if the carriage remains stopped sensor 46 will not transmit signals for the full duration of the timing interval resulting in automatic shutdown of the arc welder and disconnection of the carriage drive motor before the plates being welded are seriously injured by welding in one place.

The welding operation may be recommenced after shutdown by pushing or nudging the carriage downstream to rotate the idler wheel 14, generate a pulse signal and reinitiate the arc welding process and power the drive motor. In the case of a major failure, it may be necessary to remove the carriage from the partially welded member, correct the error and then recommence welding.

The shut-down control circuitry deactivates the arc welder and drive motor only in the event the stepped signals from sensor 46 are not received during the timing interval. In order for this system to work properly it is essential that the signals produced by the sensor reflect motion of the carriage only. This is important because structural members are welded in large, busy shops where the members and the weld carriage are subjected to vibrations apart from the welding operation. In order for reliable operation and controlled shutdown it is necessary that shop vibration transmitted to the carriage during the timing interval not jostle the carriage sufficiently to rotate the idler wheel 14 and generate a false signal, thereby preventing shutdown.

Rotary disk 98 is provided with 100 spaced circumferential perforations. The use of a disk with this number of perforations connected directly to a wheel 14 of a 5¼ inch diameter prevents shop vibrations from moving the carriage sufficiently to send false signals to the shutdown circuitry during the timing interval. It is believed that if a disk were used with an appreciably greater number of spaced aperatures, shop vibrations could generate false signals which would prevent shutdown circuitry from operating as intended. The maximum number of aperatures required for elimination of false signals depends upon the nature of the drive connection between the sensor input shaft and the idler wheel. For instance, if this connection were a 2:1 drive with the rotating at twice the speed of the idler wheel it is believed a 100 aperature disk would produce false signals and a 50 aperature disk should be used.

The rotary speed sensor 46 is mounted on the side 103 of the weld carriage away from the weld area in order to isolate the sensor from the gas torch, arc welding gun and high temperature plates. Gasket 84, cup spacer 76 with vent openings 80 and stainless steel bolts 88 help to heat-isolate the sensor from the carriage and reduce the flow of heat from the hot carriage to the sensor. Heat conduction is also reduced by use of the insulating shaft coupling 92. Despite the very high temperatures on the weld side 120 of the carriage the temperature of the sensor is appreciably reduced for reliable and long term operation. The openings 80 in the cup washer allow air to circulate through the cup spacer to cool the spacer, bolts and input shaft and reduce conduction toward the sensor. In any event, failure of the sensor 46 would shut down the carriage and arc welder without injury to the weld plates.

The movement of the carriage along the weld run of beam 112 continues until it reaches the far end, at which time the carriage is stopped by manually deactivating the carriage and arc welder or placing an obstacle in the path of the carriage to actuate the shutdown control circuitry and deactivate the arc welder and carriage motor. The torch is then extinguished.

The invention as described is used to shutdown a weld carriage and arc welding gun and the invention may be used to control a similar carriage with an attached device, other than an arc welding gun, when the device supplies energy to a work piece as the carriage moves along the piece and there is a risk that the energy supplied by the device would injure the piece if the carriage stops during the work run. For instance, the device may be an electric or gas fired torch, a magnesium burning bar, a laser emitter or the like. In the event the carriage carrying the device unexpectedly stops on the piece, the invention would operate as described, using an appropriate timing interval.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim my invention is:

1. An arc welding device comprising a weld carriage for movement along a weld plate, the carriage having a frame, a drive wheel on the frame engagable with the plate, an idler wheel on the frame engagable with the plate, a drive motor for rotating the drive wheel to move the carriage along a weld path on the plate; and arc welding gun on the carriage aimed toward a weld area extending along the plate; a speed sensor on the carriage connected to the idler wheel, the sensor including means for generating an output signal in response to rotation of the idler wheel; arc welding control means for providing welding current and weld wire to the gun and power to the drive motor; and delay shutdown control means connected to the speed sensor and to the arc welding control means for monitoring the sensor output signal and shutting down the carriage and the arc of the weld gun by disconnecting the drive motor from power, disconnecting the gun from arc welding current and stopping the delivery of weld wire to the gun when the sensor output signal is interrupted for a timing interval sufficiently long to permit the drive motor to move the carriage over minor obstructions on the drive plate but insufficiently long for injury to the weld plate by the arc of the stationary welding gun.

2. An arc welding device as in claim 1 wherein the arc welding gun is positioned on one side of the carriage and the speed sensor is positioned on the opposite side of the carriage whereby the carriage shields the sensor from the hot welding environment.

3. An arc welding device as in claim 2 including a heat-insulting connection between the sensor and carriage.

4. An arc welding device as in claim 3 wherein the speed sensor includes an input shaft, the idler wheel includes an axle having an end adjacent the other side of the carriage, the speed sensor is located outwardly of the other side of the carriage at the axle end, and including an insulating shaft coupling joining the sensor input shaft to the end of the axle, the connection and coupling limit heat flow to the sensor.

5. An arc welding device as in claim 4 wherein the connection between the speed sensor and carriage includes an aperatured cylindrical member located between the sensor and carriage and surrounding the connection between the idler wheel and sensor input shaft.

6. An arc welding device as in claim 5 wherein the connection also includes an insulating gasket between the carriage and sensor.

7. An arc welding device as in claim 6 wherein the cylindrical member is a cup spacer and includes a wall adjacent the speed sensor, and the gasket is sandwiched between the wall and the sensor.

8. An arc welding device as in claim 7 wherein the shaft coupling includes disengagable parts each joined to one of the input shaft and axle end.

9. An arc welding device as in claim 8 including a shroud joined to the carriage and extending outside of the speed sensor, the shroud being spaced from the carriage above and below the speed sensor to permit air to circulate freely around the speed sensor.

10. An arc welding device as in claim 3 wherein the speed sensor includes an input shaft, an aperatured disk on the input shaft, and a light source and a light sensor spaced on opposite sides of the disk whereby rotation of the idler wheel in response to movement of the carriage along the weld path rotates the disk, the light sensor receives a chopped light signal and generates a pulsed output signal.

11. An arc welding device as in claim 10 wherein the input shaft is connected directly to the axle and there are approximately 100 aperatures spaced around the circumference of the disk between the light source and light sensor.

12. An arc welding device as in claim 11 wherein the diameter of the idler wheel is approximately 5¼ inches.

13. An arc welding device as in claim 3 wherein the connection includes a stainless steel element extending between the sensor and carriage.

14. An arc welding device as in claim 1 wherein the timing interval of said delay shutdown means is approximately 2½ to 3 seconds in duration.

15. The method of arc welding metal plates together comprising the steps of:
(a) positioning the plates one adjacent the other to define an elongate weld area at a junction between the plates;
(b) activating a drive to move a weld carriage along a weld path on one plate so that an arc welding gun on the carriage is moved along the weld area;
(c) maintaining a welding arc between the gun and the weld area to weld the plates together as the carriage moves along the weld path; and
(d) sensing movement of the carriage along the weld path and generating an output signal responsive to such movement and unresponsive to shop vibration;
(e) shutting down the carriage drive and the welding arc in the event movement of the carriage along the weld path is interrupted for a timing interval sufficiently long to permit the carriage to traverse minor obstructions in the weld path but insufficiently long to permit the stationary welding arc to injure the weld plates.

16. The method of claim 15 including the steps of preheating the plates at the weld path downstream of the carriage, moving the carriage past the preheated plates before arc welding and then arc welding the plates together upstream of the carriage.

17. The method of claim 15 including the steps of placing the carriage on the plate at the start of the weld path with the weld gun and drive shut down and starting movement of the carriage and initiating welding by nudging the carriage downstream along the path.

18. The method of claim 15 including the step of stopping the movement of the carriage and gun along the weld path by stopping movement of the carriage on the plate to shut down the carriage and welding arc after running of the timing interval.

19. The method of claim 15 wherein the plates each have a thickness of about ¼ to 1 inch and the length of the timing interval is about 2½ to 3 seconds.

20. The method of claim 15 wherein the carriage includes an idler wheel engaging a plate, including the stop of generating an output signal of about 100 pulses for each revolution of the idler wheel as the carriage moves along the weld path.

21. The method of claim 20 wherein the diameter of the idler wheel is about 5¼ inches.

22. The method of claim 15 including the step of vibrating the plates and carriage in response to remote shop vibrations during the timing interval.

23. A device comprising a carriage for movement along a work surface, the carriage having a frame, a drive wheel on the frame engageable with the surface, an idler wheel on the frame engageable with the surface, a drive motor for rotating the drive wheel to move the carriage along a work path on the surface; energy supplying means on the carriage aimed toward an area extending along the path to heat the area, a speed sensor on the carriage connected to the idler wheel, the sensor including means for generating an output signal in response to rotation of the idler wheel; control means for providing power to the drive motor; and delay shut down control means connected to the speed sensor and to the control means and the energy supplying means for monitoring the sensor output signal and shutting down the carriage by disconnecting the drive motor from power and deactivating the energy supplying means when the sensor output signal is interrupted for a timing interval sufficiently long to permit the drive motor to move the carriage over minor obstacles on the surface but insufficiently long for injury to the surface by the energy supplying means.

24. A device in claim 23 wherein the energy supplying means is positioned on one side of the carriage and the speed sensor is positioned on the opposite side of the carriage whereby the carriage shields the sensor from energy supplied to the surface by energy supplying means.

25. A device as in claim 24 including a heat-insulating connection between the sensor and carriage.

26. A device as in claim 25 wherein the speed sensor includes an input shaft, the idler wheel includes an axle having an end adjacent the outer side of the carriage.

The speed sensor is located outwardly of the other side of the carriage at the axle end, and including an insulating shaft coupling joining the sensor output shaft to the end of the axle, the connection and coupling limit heat flow to the sensor.

27. A device as in claim 26 wherein the connection between the speed sensor and carriage includes an aperatured cylindrical member located between the sensor and carriage and surrounding the connection between the idler wheel and sensor input shaft.

28. A device as in claim 27 wherein the connection also includes an insulating gasket between the carriage and sensor.

29. A device as in claim 28 wherein the cylindrical member is a cup spacer and includes a wall adjacent the speed sensor, and the gasket is sandwiched between the wall and the sensor.

30. An arc welding device as in claim 23 wherein the timing interval of said delay shutdown means is approximately 2½ to 3 seconds in duration.

31. The method of applying energy to a work path extending along a surface comprising the steps of:
 (a) actuating a drive to move a carriage along a path on the surface so that an energy supplying device on the carriage is moved along the surface;
 (b) supplying energy from the device to the surface as the carriage moves along the path; and
 (c) sensing movement of the carriage along the path and generating an output signal responsive to such movement and unresponsive to shop vibration; and
 (d) shutting down the carriage drive and the energy supplying device in the event movement of the carriage along the path is interrupted for a timing interval sufficiently long to permit the carriage to traverse minor obstructions in the path but insufficiently long to permit the stationary energy supplying device to injure the surface.

32. The method of claim 31 including the steps of placing the carriage on the surface at the start of the path with the energy supplying device and motor shutdown and starting movement of the carriage and initiating operation of the energy supplying device by nudging the carriage downstream along the path.

33. The method of claim 31 including the step of stopping movement of the carriage and the energy supplying device along the path by stopping movement of the carriage to shutdown the carriage drive and energy supplying device after running of the timing interval.

34. The method of claim 31 including the step of vibrating the surface and carriage in response to remote shop vibrations during the timing interval.

* * * * *